Figure 1:
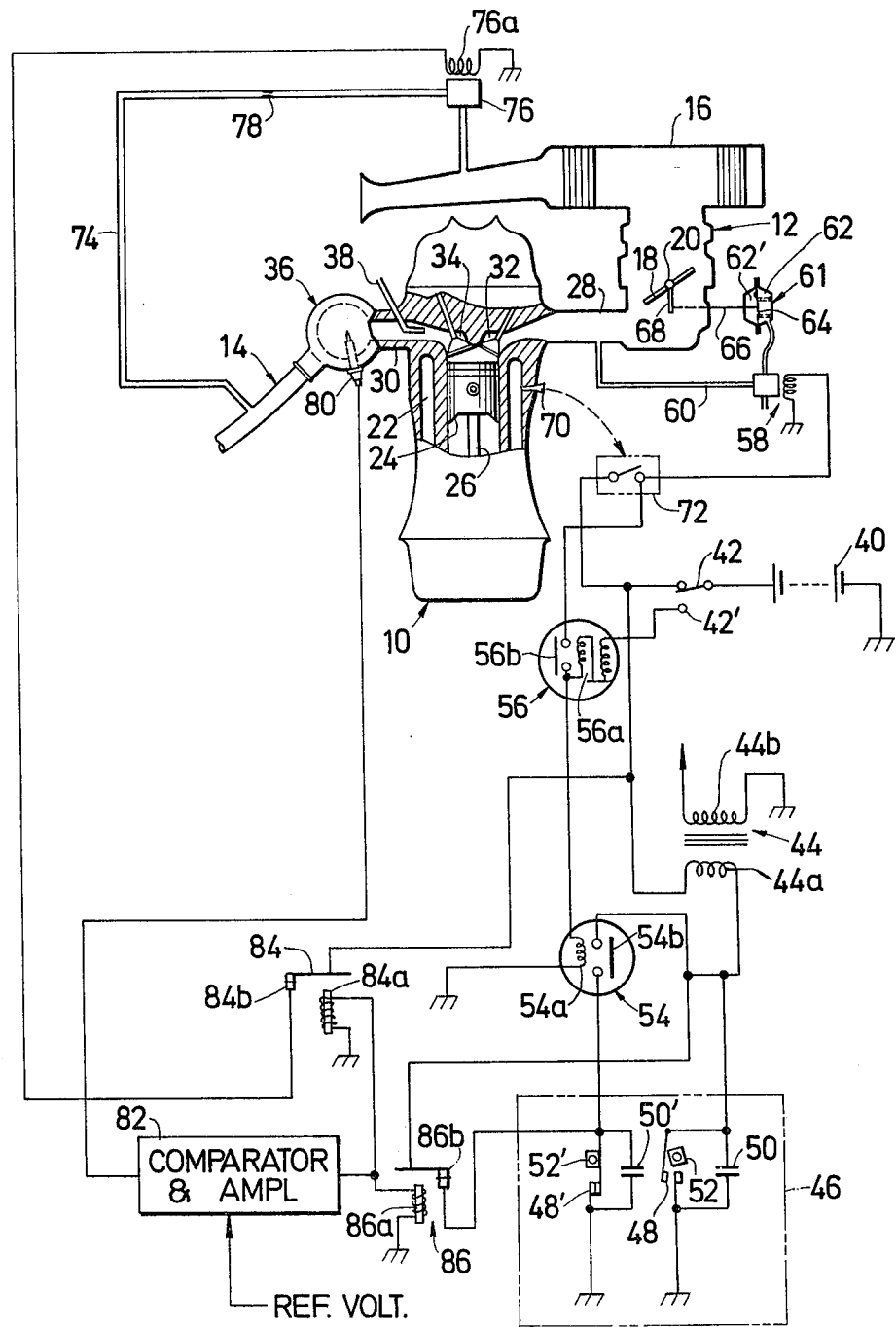

United States Patent [19]

Shioyama et al.

[11] 3,927,523
[45] Dec. 23, 1975

[54] EXHAUST CLEANING SYSTEM FOR AUTOMOTIVE INTERNAL COMBUSTION ENGINE

[75] Inventors: Giichi Shioyama, Yokosuka; Kenji Masaki, Yokohama; Shuya Nambu, Yokosuka, all of Japan

[73] Assignee: Nissan Motor Co., Ltd., Japan

[22] Filed: Mar. 6, 1974

[21] Appl. No.: 448,638

[30] Foreign Application Priority Data
Mar. 13, 1973 Japan.................. 48-29220

[52] U.S. Cl. ............. 60/278; 60/284; 60/285; 123/117 R; 123/119 A; 123/122 D
[51] Int. Cl.² ....................... F02B 75/10
[58] Field of Search ......... 60/278, 284, 285, 279; 123/119 A, 117 R, 122 D

[56] References Cited
UNITED STATES PATENTS

| | | | |
|---|---|---|---|
| 2,287,593 | 6/1942 | Ball.................. | 123/119 A |
| 2,633,698 | 4/1953 | Nettel................ | 123/122 D |
| 3,172,251 | 3/1965 | Johnson.............. | 60/278 |
| 3,699,683 | 10/1972 | Tourtellotte.......... | 60/279 |
| 3,732,696 | 5/1973 | Masaki............... | 60/284 |
| 3,739,583 | 6/1973 | Tourtellotte.......... | 60/278 |
| 3,774,582 | 11/1973 | Masaki............... | 60/285 |
| 3,791,144 | 2/1974 | Lang.................. | 60/285 |

*Primary Examiner*—Douglas Hart
*Attorney, Agent, or Firm*—Robert E. Burns; Emmanuel J. Lobato; Bruce L. Adams

[57] ABSTRACT

Improvements are made in an automotive internal combustion engine equipped with a thermal reactor, a catalytic converter or a combination of these so as to enable the thermal reactor and/or the catalytic converter to reach its activation temperature in a shortened period of time after the engine has initially been cranked by a cranking motor whereby toxic combustible residues can be re-oxidized at an early stage of the idling operation of the engine. The improvements consist of an exhaust recirculation passageway which is made operative to recirculate the exhaust gases from the engine for warming up an air-fuel mixture to be fed to the engine when the temperature of the exhaust gases is lower than an activation temperature of the thermal reactor or the catalytic converter. Such improvements will be more advantageous when combined with a rapid engine warming arrangement for opening a carburetor throttle valve wider than usual and providing retarded spark-advance timings during cold driving of the engine.

4 Claims, 2 Drawing Figures

EXHAUST CLEANING SYSTEM FOR AUTOMOTIVE INTERNAL COMBUSTION ENGINE

The present invention relates to internal combustion engines for automotive vehicles and, more particularly, to an exhaust cleaning system for use with an automotive internal combustion engine of the type which is equipped with means adapted to re-oxidize or "afterburn" combustible residues contained in exhaust gases emitted from the engine.

The means to re-oxidize the combustible compounds such as hydrocarbons and carbon monoxide include a thermal reactor or a catalytic converter which is mounted in an exhaust system of the engine. One of the problems encountered in the thermal reactor or the catalytic converter is that such a device remains inactive until it is heated to a certain temperature which is, in the present description, referred to as an activation temperature. The activation temperature is usually about 850°C for the thermal reactor and about 450°C for the catalytic converter, although it may more or less vary depending upon the specific designs of the thermal reactors or the catalytic converters.

Provision of the thermal reactor in the internal combustion engine gives rise to an increase in the thermal capacity of the engine as a whole and as a consequence invites a substantial delay in the warming-up of the engine from a cold condition and retarding the activation of the thermal reactor. Unusually increased amounts of toxic hydrocarbons and carbon monoxide are therefore emitted from the exhaust system of the engine during cold driving of the engine, presently resulting in an important cause of vehicular air pollution problems. This tendency is pronounced because of the fact that a relatively rich air-fuel mixture should be used in the internal combustion engine equipped with the thermal reactor.

In the internal combustion engine incorporating the catalytic converter, it also takes a considerable time before the catalytic converter is heated to the activation temperature thereof so that the toxic hydrocarbons and carbon monoxide are contained in unusually increased proportions in the exhaust gases from the engine being driven at cold.

Warming up the engines in shortened intervals is therefore an important key toward the solution of the air pollution problems and a variety of devices have thus far been proposed to achieve this end. One of such pollution preventive devices is a rapid engine warming arrangement which is adapted to open the throttle valve of the carburetor simultaneously to a predetermined angle simultaneously when the engine is started and, in addition, the ignition timings are retarded so as to enable the exhaust system of the engine to be heated at an increased rate. Research and development efforts have been made by the inventors of the present application in quest of further accelerated warming of the exhaust systems of the internal combustion engines equipped with such rapid engine warming arrangements, resulting in a finding that the temperatures in the exhaust system can be increased at an increased rate and in a shortened period of time if the hot exhaust gases are recirculated to air intake units of the engines. The present invention has been completed on the basis of such a finding.

Recirculation of the hot exhaust gases to the air intake unit of the engine is usually put into practice for the purpose of inhibiting the production of nitrogen oxides in the exhaust gases and is effected after the engine has been warmed up to its proper operating temperature, viz., not during cold driving of the engine. The present invention however contemplates recirculating the exhaust gases to the air intake unit of the engine even during cold driving of the engine so that the exhaust system of the engine can be heated faster to the activation temperature of the exhaust re-oxidizing device attached to the engine.

In accordance with the present invention, there is provided a combination of an exhaust recirculation passageway leading from exhaust outlet means to air inlet means of an internal combustion engine, valve means disposed in the exhaust recirculation passageway for opening the passageway when actuated, sensing means for sensing the temperature of exhaust cleaning means incorporated in the exhaust outlet means and producing a signal in response to the temperature of the exhaust cleaning system lower than a predetermined level and switch means for actuating the valve means in response to the signal from the sensing means. If such a combination is to be incorporated into an internal combustion engine having an ignition system using a distributor which has breaker points providing delayed spark advance in addition to breaker points providing normal spark advance, means may be further provided so as to have the delayed-advance breaker points short-circuited to the primary winding of the ignition coil so that the ignition timings are retarded if the temperature of the exhaust cleaning means is lower than the predetermined level after the engine has been warmed up to its proper operating temperature.

Figure 2:
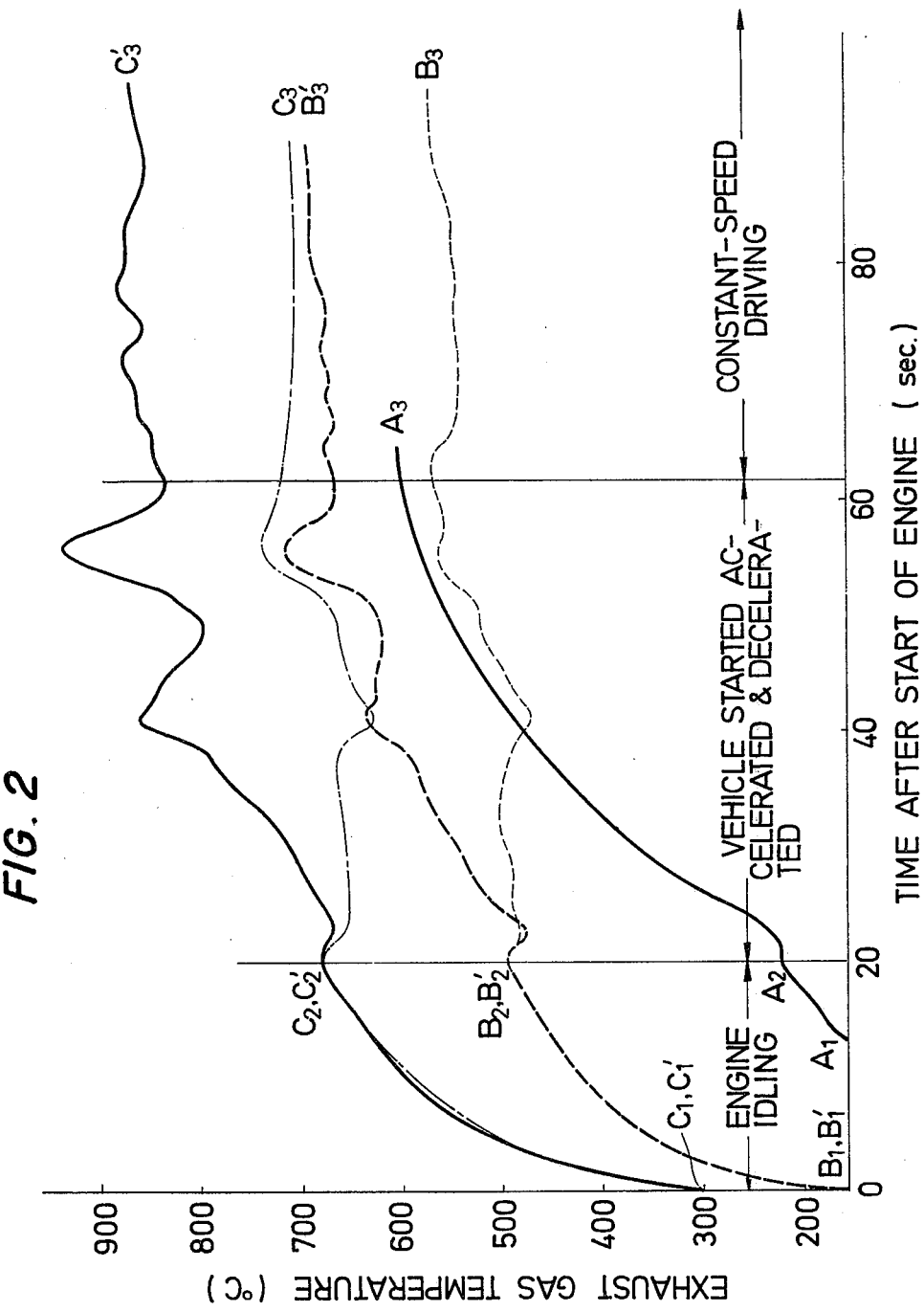

Other features and advantages of the exhaust cleaning arrangement according to the present invention will become apparent from the following description taken in conjunction with the accompanying drawings, in which:

FIG. 1 is a schematic view showing a preferred embodiment of the exhaust cleaning arrangement for an automotive internal combustion engine according to the present invention; and FIG. 2 is a graph which indicates the effectiveness of the exhaust cleaning arrangement according to the present invention.

Referring to FIG. 1, the exhaust cleaning arrangement embodying the present invention is incorporated in an internal combustion engine 10 having a carburetor 12 and an exhaust system 14. The carburetor 12 is connected at its inlet end to an air cleaner 16 and has a throttle valve 18 which is rotatably mounted on a valve shaft 20. The engine 10 includes a cylinder block which consists of engine cylinders only one of which is illustrated in the drawing. The engine cylinder is surrounded by a water jacket 22 and contains a piston 24 which is connected to a crankshaft (not shown) through a connecting rod 26. The piston 24 is movable in a combustion chamber which communicates on one side with the carburetor 12 through an intake manifold 28 and on the other side with the exhaust system 14 including an exhaust manifold 30. At the outlet of the intake manifold 28 is located an intake valve 32 and at the inlet of the exhaust manifold 30 is located an exhaust valve 34. The construction of the internal combustion engine 10 above outlined is typical of the water-cooled internal combustion engines for automotive vehicles and therefore no further description is necessary as to the details of the construction and operation of the engine.

The engine 10 is provided with thermal reactor 36 which is incorporated into the exhaust system 14. The thermal reactor 36 usually located downstream of the exhaust manifold 30 and is operative to re-oxidize or "afterburn" the combustible residues such as hydrocarbons and carbon monoxide contained in the exhaust gases emitted from the engine 10 so that the exhaust gases are cleaned up before being discharged to the open air from the exhaust system 14. The construction and operation of the thermal reactor 36 thus functioning are well known to those skilled in the art and are rather immaterial for the understanding of the present invention, and no detailed description thereof will be herein incorporated. For the purpose of increasing the afterburning efficiency of the combustible residues in the exhaust gases, it is a usual practice to supply additional air to the exhaust gases through an air injection nozzle 38 which projects into the exhaust manifold 30.

As previously pointed out, the installation of the thermal reactor 36 on the engine 10 results in an increased thermal capacity of the engine as a whole and accordingly in delayed warming of the engine operating at cold. To avoid this difficulty, the engine 10 is further provided with rapid engine warming arrangement which operates in cooperation with an ignition system of the engine 10. The ignition system comprises, as is customary in the art, a power source 40, an ignition switch 42, an ignition coil 44, and a distributor 46 of which only breaker points and ignition condensers are herein shown. The ignition coil 44 has a primary winding 44a connected at one end to the power source 40 across the ignition switch 42 and grounded at the other across the breaker points of the ignition distributor, a secondary winding 44b grounded at one end and connected at the other to the rotor of the cap (not shown) of the distributor 46, and a soft iron core 44c around which the primary and secondary windings 44a and 44b are wrapped. The ignition distributor 46 is shown, by way of example, as being of the type which possesses first and second sets of breaker points 48 and 48', respectively, and first and second ignition condensers 50 and 50' which are connected across the breaker points 48 and 48', respectively. The first set of breaker points 48 is operated to alternately close and open by means of a first breaker cam 52 in accordance with such schedules as will provide normal spark advance whereas the second set of breaker points 48 is operated to alternately close and open by means of a second breaker cam 52' in accordance with such schedules as will provide retarded spark advance. The first set of breaker points 48 is connected between the primary winding 44a of the ignition coil 44 and the ground connection. On the other hand, the second set of breaker points 48' is connected in parallel with the first set of breaker points 48 between the primary winding 44a of the ignition coil 44 across a time relay 54. The time relay 54 has a relay coil 54a and a set of normally-open contacts 54b and is adapted to have the contacts 54b closed with a predetermined interval of time after the relay coil 54a has been energized.

The rapid engine warming arrangement further comprises a self-holding relay 56 which is adapted to remain closed once it is closed and until it is disconnected from the power source. The self-holding relay 56 consists of relay coils 56a and a set of normally-open contacts 56b. The relay coils 56a are connected between the relay coil 54a of the time relay 54 and a cranking motor switch 42' which is usually combined together with the ignition switch 42 for energizing a cranking motor (not shown) for the engine 10 from the power source 40 when the ignition switch 42 is shifted to a position to start up the engine 10 from rest. The normally-open contacts 56b of the self-holding relay 56 are connected between the relay coil 54a of the time relay 54 and a coil of a solenoid-operated valve 58 which is located in a vacuum passageway 60 leading from the intake manifold 28 of the engine 10 and terminating in a diaphragm-operated throttle control unit 61. The diaphragm-operated throttle control unit 61 has chambers 62 and 62' which are separated from each other by means of a diaphragm 64. One chamber 62 is in constant communication with the leading end of the vacuum passageway 60 whereas the other chamber 62' is vented to the atmosphere so that the diaphragm 64 is movable back and forth depending upon a differential pressure between the chambers 62 and 62' created due to a subatmospheric pressure developed in the chamber 62 by the vacuum directed into the chamber 62 from the intake manifold 28 of the engine 10 through the vacuum passageway 60 when the solenoid-operated valve 58 is open. The diaphragm 64 is connected to a plunger 66 which is, in turn, connected through a mechanical linkage 68 to the throttle valve 18 of the carburetor 12 for turning the throttle valve 18 about the valve shaft 20 through an angle dictated by an amount of displacement of the diaphragm 64. The diaphragm 64 is urged toward a position to hold the throttle valve 18 in a closed-throttle position by means of a preload spring which is accommodated in the chamber 62.

A temperature sensor 70 is embedded in or contacted by the water jacket 22 of the engine 10. The temperature sensor 70 is responsive to changes in the temperature of the water jacket 22, viz., to the temperature in the engine and produces an output signal in response to the engine temperature higher than a predetermined level of, for example, 60° in centigrade. The signal thus produced by the sensor 70 is applied to a temperature-responsive switch 72 which is adapted to open in the absence of the output signal from the sensor 70 and close when supplied with the signal from the sensor 70. The temperature-responsive switch 72 is connected between the coil of the solenoid-operated valve 58 and the power source 40.

The operation of the rapid engine warming arrangement thus constructed will now be described.

When the ignition switch 42 is shifted to the position closing the cranking motor switch 42' so as to crank the engine 10 by the cranking motor (not shown), the coils 56a of the self-holding relay 56 are energized from the power source 40 so that the normally-open contacts 56b of the relay 56 are caused to close. The closed condition of the relay 56 is maintained unless the ignition switch 42 is shifted to a position opening the cranking motor switch 42'. In a predetermined period of time after the contacts 56b of the self-holding relay 56 are thus closed, the normally-open contacts 54b of the time switch 54 are closed by energization of the coil 54a from the power source 40 through the cranking motor switch 42' and the coils 56a of the self-holding relay 56. A closed loop is therefore constituted by the power source 40, the ignition switch 42, the primary winding 44a of the ignition coil 44 through the ground connection when the second set of breaker points 48' are closed by the second breaker cam 52' so that the spark plug (not shown) is energized at retarded spark advance timings. In response to the closing of the ignition switch 42, the coil of the solenoid-operated valve 58 is also energized from the power source 40 because the temperature in the engine 10 is lower than the predetermined level so that the temperature-responsive switch 72 remains closed in the absence of the output signal from the temperature sensor 70. The solenoid-operated valve 58 is accordingly open so that the vacuum developed in the intake manifold 28 of the engine 10 after the engine has been started by the cranking motor is directed into the chamer 62 in the diaphragm-operated throttle control unit 60. The diaphragm 64 is thus moved against the opposing action of the preload spring in the chamber 62 and drives the carburetor throttle valve 18 to turn about the shaft 20 for providing a throttle opening which is appreciably wider than usual. The rapid engine warming arrangement shown in FIG. 1 is thus adapted to achieve essentially a dual function of moving the carburetor throttle valve 18 to an angular position providing a wider throttle opening during idling of the engine 10 than that usually achieved and retarding the ignition timings so as to compensate for an increment in the revolution speed of the engine as caused by the increased throttle opening. An increased amount of heat is thus transferred to the engine as a result of the increased throttle opening and, at the same time, the exhaust gases from the engine are heated at an increased rate as a result of the delayed ignition timings which contribute to the afterburning of the exhaust gases. The thermal reactor 36 can be heated to its activation temperature in a shortened period of time after the engine has first been cranked from a cold starting condition.

In accordance with the present invention, the period of time required to warm up the engine and the exhaust gases from the engine can be further shortened by means adapted to have the exhaust gases recirculated through the engine. As illustrated in FIG. 1, such means comprise an exhaust recirculation passageway leading from the exhaust system 14 downstream of the thermal reactor 36 and terminating in the air cleaner 16 or, where otherwise desired, in any part of the carburetor 12. A solenoid-operated valve 76 having a coil 76a is located in the passageway 74 for closing and opening the passageway when the coil 76a is energized and de-energized, respectively. Designated by reference numeral 78 is a flow restriction means such as an orifice which is inserted into the passageway 74 for the purpose of metering the flow of the exhaust gases to be recirculated into the air cleaner 16.

A temperature sensor 80 is attached to the thermal reactor 36. The temperature sensor 80 is adapted to produce an electrical signal having a voltage proportional to the temperature in the thermal reactor 36. The signal thus produced by the sensor 80 is supplied to a comparing and amplifying circuit 82. The comparing and amplifying circuit 82 is operative to compare the signal voltage supplied from the sensor 80 with a reference voltage which is in correspondence with a predetermined level of temperature of, for example, about 850° in centigrade (which temperature is the activation temperature of the thermal reactor 36), thereby delivering a drive current at its output terminal when the signal voltage from the temperature sensor 80 is lower than the reference voltage. The drive current thus delivered from the comparing and amplifying circuit 82 is fed to coils 84a and 86a of first and second relays 84 and 86, having normally-open contacts 84b and 86b, respectively. The contacts 84b of the first relay 84 are connected between the coil 76a of the solenoid-operated valve 76 in the exhaust recirculation passageway 74 and, the power source 40 across the ignition switch 42. The solenoid-operated valve 76 is thus actuated to open when the ignition switch 42 is closed and concurrently the coil 84a of the first relay 84 is being energized with the output current from the comparing and amplifying circuit 82. The contacts 86b of the second relay 86 are, on the other hand, connected across the normally-open contacts 54b of the time relay 54 or, in other words, between the second set of breaker points 48' of the ignition distributor 46 and the primary winding 44a of the ignition coil 44 in parallel with the first set of breaker points 52 of the distributor 46. The second set of breaker points 48' of the distributor 46 are thus connected to the power source 40 for providing retarded spark advance timings when the ignition switch 42 is closed and concurrently the coil 86a of the second relay 86 is energized with the output current from the comparing and amplifying circuit 82.

When, the operation, the engine 10 is started from cold, the temperature of the exhaust gases emitted from the engine is lower than the predetermined level of, for example, 850° in centigrade so that the thermal reactor 36 disposed in the exhaust system 14 remains inoperative to re-combust the combustible residues contained in the exhaust gases. The temperature sensor 80 mounted on the thermal reactor 36 is responsive to such a temperature of the exhaust gases and produces an output voltage proportional to the temperature detected. The signal voltage thus applied to the comparing and amplifying circuit 82 is lower than the reference voltage impressed thereon and, as a consequence, the comparing and amplifying circuit delivers a drive current as an output thereof. The coils 84a and 86a of the first and second relays 84 and 86, respectively, are thus energized with the drive current from the comparing and amplifying circuit 82 so that the normally-open contacts 84b and 86b of the relays 84 and 86 are simultaneously closed. Since, under these conditions, the ignition switch 42 is in a closed condition, the coil 76a of the solenoid-operated valve 76 is connected to the power source 40 through the contacts 84a of the first relay 84 and the ignition switch 42. The valve 76 is consequently made open so that the exhaust gases passed from the thermal reactor 36 are recirculated into the air cleaner 16 via the exhaust recirculation passageway 74 at a rate primarily dictated by the orifice 78 in the passageway 74. The hot exhaust gases entering the air cleaner 16 are thus admixed to fresh air drawn into the carburetor 12 so that a warmed air-fuel mixture is introduced into the combustion chamber of the engine 10 through the intake manifold 28. While the hot exhaust gases from the engine 10 are being recirculated into the carburetor 12 in this manner, the second set of breaker points 52' of the ignition distributor 46 are operative to energize the ignition spark plug (not shown) at delayed spark advance timings because the contacts 86b of the second relay 86 are closed so that the breaker points 52' are short circuited to the power source 40 through the primary winding 44a of the ignition coil 44. By reason of the combined effects of the air-fuel mixture which is positively warmed by the recirculated exhaust gases and the retarded spark advance timings, the exhaust gases are heated rapidly up to the activation temperature of the thermal reactor 36 which is therefore activated in a shortened period of time after the ignition switch 42 has been closed. When the engine 10 is warmed up to its normal operating temperature, the temperature-responsive switch 72 forming part of the rapid engine warming arrangement will open so that the normally-open contacts 54a of the time relay 54 also opens. If, however, the temperature of the exhaust gases from the engine 10 still remains lower than the predetermined level under these conditions, the comparing and amplifying circuit 82 remains operative to deliver the drive current to the coils 84a and 86a of the first and second relays 84 and 86, respectively, so that the hot exhaust gases continue to be recirculated into the carburetor 12 and at the same time the spark plug is kept energized at the retarded spark advance timings until the exhaust gases are heated up to the activation temperature of the thermal reactor 36.

Where desired, comparing and amplifying circuit 82 may be so arranged as to be inoperative to energize the coil 84a of the first relay 84 immediately and accordingly to hold the solenoid-operated valve 76 closed for a short while after the engine 10 has been started from cold so that the exhaust gases are not recirculated during an initial period of the cold driving of the engine when the exhaust gases remain inoperative to heat the air-fuel mixture to be fed to the engine. For this purpose, a suitable delay circuit may be incorporated into the comparing and amplifying circuit 82. The delay circuit may be so arranged as to enable the comparing and amplifying circuit 82 to deliver the output drive current to the coil 84a of the first relay 84 in a predetermined period of time of, for example, 20 seconds after the engine 10 has initially been started up by the cranking motor.

In the foregoing description, the exhaust cleaning arrangement according to the present invention has been described and shown as being incorporated into the internal combustion engine which is equipped with the thermal reactor. Such is, however, merely for the purpose of illustrating the present invention and, therefore, the improvement herein disclosed may be incorporated into an internal combustion engine using the catalytic converter or, otherwise, the combination of the thermal reactor and the catalytic converter. Where the exhaust cleaning arrangement according to the present invention is thus incorporated into the internal combustion engine which is provided with the catalytic converter, the temperature sensor to detect the temperature of the exhaust gases may be located immediately upstream of the catalytic converter. Where, on the other hand, the exhaust cleaning arrangement is applied to the internal combustion engine provided with the combination of the thermal reactor and the catalytic converter, the temperature sensor may also be located upstream of the catalytic converter in view of the fact that the activation temperature of the catalytic converter is lower than that of the thermal reactor and that the catalytic converter tends to be burned when subjected at an extremely high temperature.

Although, moreover, the present invention has been described and shown on the internal combustion engine of the type which is provided with the throttle opening means including the solenoid-operated valve 58 and the diaphragm-operated throttle control unit 61 and the spark advance delaying means including the second sets of breaker points 48' of the ignition distributor 46, it will be apparent that the exhaust recirculating arrangement herein proposed can be incorporated into any other internal combustion engine which is void of such throttle-opening means and/or spark advance delaying means. Where the exhaust cleaning arrangement according to the present invention is realized in the internal combustion engine which is void of the spark advance retarding means of the nature described with reference FIG. 1, the second relay 86 may be removed so that the output current from the comparing and amplifying circuit 82 is fed only to the first relay 84. The engine herein shown has been assumed to be of the water-cooled type, but it is apparent that the improvement according to the present invention can be incorporated into an internal combustion engine using an air-cooling system. In this instance, the temperature sensor 70 which has been described as being located in conjunction with the water jacket 22 of the engine should be mounted on cooling fins of the air-cooling system. If, furthermore, it is desired that the engine incorporating the improvement according to the present invention be provided with means to inhibit production of toxic nitrogen oxides in the exhaust gases, such means may be arrangement in parallel with the solenoid-operated valve 76 interposed in the exhaust recirculation passageway 74.

FIG. 2 illustrates effectiveness of the exhaust cleaning arrangement shown in FIG. 1, wherein the axis of abscissa is representative of the time in seconds after the engine has been initially cranked and the axis of ordinate is representative of the temperature of the exhaust gases emitted from the engine equipped with the thermal reactor. Curve $A_1$-$A_2$-$A_3$ indicates the variation in the temperature of the exhaust gases at a central portion of the thermal reactor in an internal combustion engine which is provided with no such means as to positively warm up the exhaust gases to be passed through the thermal reactor. Each of curves $B_1$-$B_2$-$B_3$ and $B_1'$-$B_2'$-$B_3'$ indicates the variation in the temperature of the exhaust gases from an internal combustion engine provided with the rapid engine warming arrangement consisting of the throttle opening means and the ignition spark advance retarding means of the natures illustrated in FIG. 1. The curve $B_1$-$B_2$-$B_3$ is achieved when the engine of the specified type is started from cold whereas the curve $B_1'$-$B_2'$-$B_3'$ is achieved when the engine is re-started after it has once been stopped. The temperatures indicated by the curves $B_1$-$B_2$-$B_3$ and $B_1'$-$B_2'$-$B_3'$ have been measured at a central portion and an outlet, respectively, of the thermal reactor. Each of curves $C_1$-$C_2$-$C_3$ and $C_1'$-$C_2'$-$C_3'$, on the other hand, stands for the variation in the temperature of the exhaust gases emitted from the internal combustion engine incorporating the combination of the rapid engine warming arrangement of prior art and the exhaust recirculation means according to the present invention. The curve $C_1$-$C_2$-$C_3$ is observed when the engine is started from cold whereas the engine is re-started after it has once been stopped. The temperatures of the exhaust gases are measured at a central portion of the thermal reactor for the curve $C_1$-$C_2$-$C_3$ and at an outlet of the thermal reactor for the curve $C_1'$-$C_2'$-$C_3'$ similarly to the curves $B_1$-$B_2$-$B_3$ and $B_1'$-$B_2'$-$B_3'$, respectively. In the cases of the curves $B_1$-$B_2$-$B_3$, $B_1'$-$B_2'$-$B_3'$, $C_1$-$C_2$-$C_3$ and $C_1'$-$C_2'$-$C_3'$, the rapid engine warming arrangement including the throttle opening means and the ignition spark advance retarding means is made operative only during idling of the engines. From the comparison of the curves $C_1$-$C_2$-

$C_3$ and $C_1'-C_2'-C_3'$ with the curves $A_1-A_2-A_3$, $B_1-B_2-B_3$ and $B_1'-B_2'-B_3'$ thus obtained, it will be clearly appreciated that the improvement according to the present invention is considerably conducive to heating the exhaust gases at an increased rate after the engine has been cranked and accordingly to enabling the thermal reactor on the exhaust system to become operative to afterburn the toxic combustible residues in the exhaust gases in a shortened period of time after the engine has initially been cranked even from a cold starting condition. The exhaust cleaning arrangement herein disclosed in this expected to significantly contribute to solution of the vehicular air pollution problems of late.

What is claimed is:

1. In an automotive internal combustion engine having an air inlet and exhaust outlet; exhaust cleaning means connected to said exhaust outlet for reducing toxic compounds in the exhaust gases; and a rapid engine warming system including delayed spark advance breaker points in an ignition distributor and control means for establishing connection between said delayed spark advance breaker points and an ignition power source when the engine temperature is lower than a first predetermined level; the improvement which comprises:

an exhaust recirculation passageway leading from the outlet of said exhaust cleaning means to said air inlet;

electrically energizable valve means disposed in said exhaust recirculation passageway for opening the passageway when energized;

sensing means responsive to the temperature of said exhaust cleaning system for producing an electrical signal when the temperature of said exhaust cleaning system is lower than a second predetermined level;

first switch means for energizing said valve means in response to said electrical signal; and second switch means responsive to said electrical signal for providing a circuit between said delayed spark advance breaker points and said ignition power source to render said delayed spark advance breaker points effective to retard the ignition timing of said internal combustion engine.

2. In an automotive internal combustion engine according to claim 1, wherein said sensing means comprises a temperature sensor for developing a voltage proportional to the temperature of said exhaust cleaning means, and a comparator responsive to the voltage developed by said temperature sensor for developing said electrical signal when the voltage developed by said temperature sensor is less than a certain value.

3. In an internal combustion engine emission control system of the type including an engine rapid warming system comprised of a set of distributor breaker points effective when operative to retard ignition spark timing and control means responsive to engine temperature for rendering said set of distributor breaker points operative when the engine temperature is less than a first value; and means receptive of engine exhaust gas for reducing the concentration of toxic compounds in the exhaust gases; the improvement which comprises:

means defining an exhaust recirculation flowpath for recirculating engine exhaust gases to an engine air intake;

a normally closed electrically energizable valve effective to open said means defining an exhaust recirculation flowpath when energized;

temperature sensing means for energizing said normally closed electrically energizable valve when the temperature of said means for reducing the concentration of toxic compounds in the exhaust gases is less than a second value; and means cooperative with said temperature sensing means for rendering said set of distributor points operative when said normally closed electrically energizable valve is energized.

4. In an internal combustion engine emission control system according to claim 3, wherein said temperature sensing means comprises a temperature sensor for developing a voltage proportional to the temperature of said means for reducing the concentration of toxic compounds in exhaust gases, and a comparator responsive to the voltage developed by said temperature sensor for energizing said normally closed electrically energizable valve when the voltage developed by said temperature sensor is less than a certain value.

* * * * *